Oct. 26, 1937.　　　　　M. LOCK　　　　　2,097,072
TRANSMITTER ARRANGEMENT FOR GUIDING AIRPLANES
Filed March 9, 1935　　　2 Sheets-Sheet 1
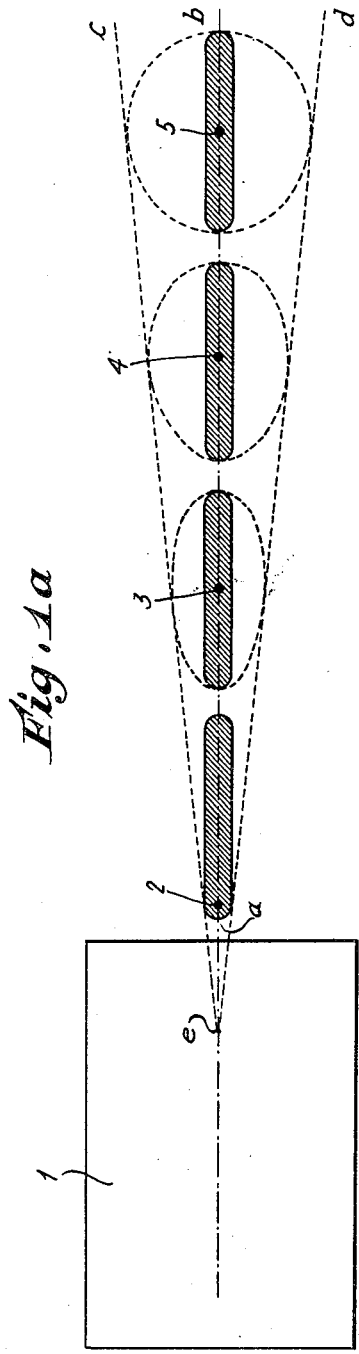
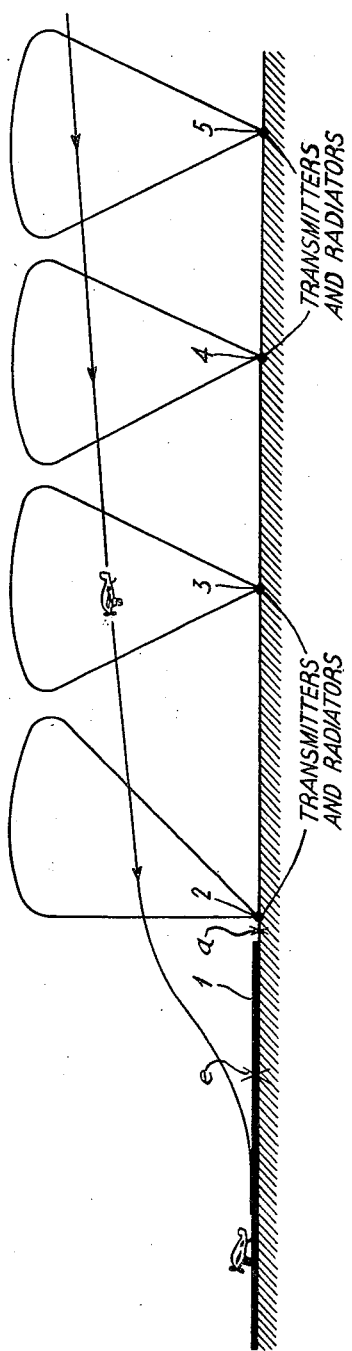
INVENTOR
MICHAEL LOCK
BY
ATTORNEY Oct. 26, 1937.  M. LOCK  2,097,072
TRANSMITTER ARRANGEMENT FOR GUIDING AIRPLANES
Filed March 9, 1935  2 Sheets-Sheet 2
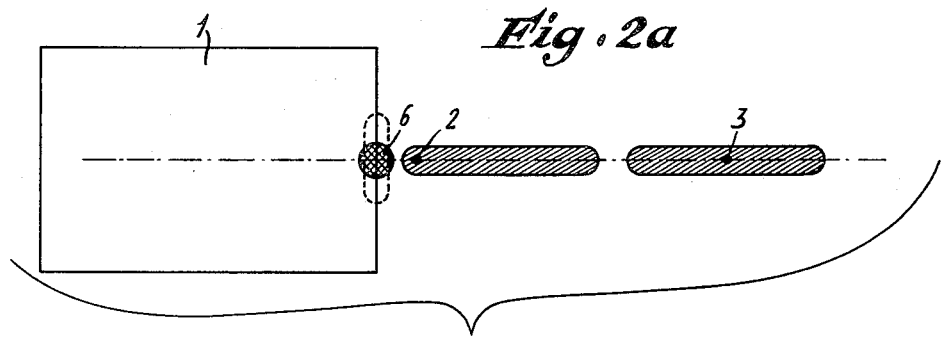
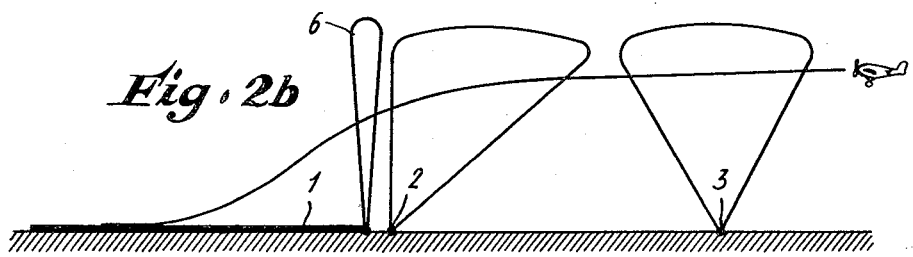
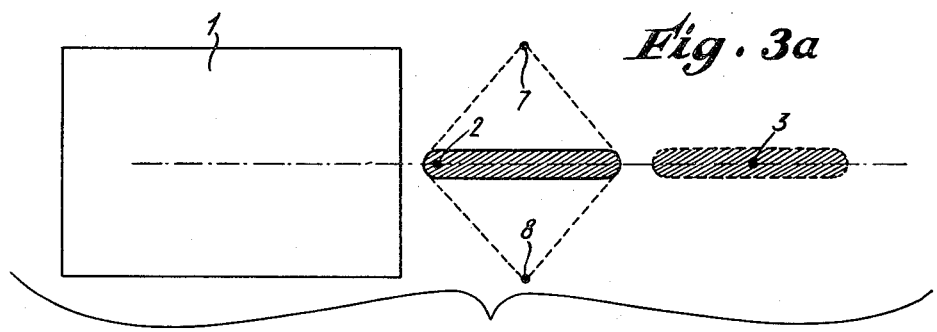
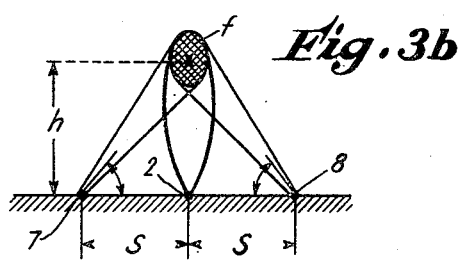
INVENTOR
MICHAEL LOCK
BY
ATTORNEY Patented Oct. 26, 1937

2,097,072

UNITED STATES PATENT OFFICE 2,097,072

TRANSMITTER ARRANGEMENT FOR GUIDING AIRPLANES

Michael Lock, Berlin, Germany, assignor to Telefunken Gesellschaft fur Drahtlose Telegraphie m. b. H., Berlin, Germany, a corporation of Germany Application March 9, 1935, Serial No. 10,197
In Germany March 10, 1934

3 Claims. (Cl. 250—11)

The present invention is concerned with means adapted to guide aircraft along definite courses, say, for guiding them towards the approach to airports or for shunting them in the case of obstacles.

The directrix or guide-line according to the present invention is formed by the longitudinal axes of a row of vertical radiators designed to produce narrow beams and whose identification or modulation indicates the approximate horizontal distance from a special point, such, for example, as an intended landing point at an airport.

For defining and fixing a flying course and guide-line, methods are known in the prior art in which a single radiator or beacon is employed for the purpose of identification. Methods of this kind involve the draw-back that the beam or radiation cone presenting a small angle of inclination in reference to the horizontal becomes so wide (in proportion to greater distance from the transmitter or beacon) that it is very inconvenient to use it as a guide line. For the purpose of orientation, it is necessary to fly considerable distances towards the right or the left-hand side in order that lateral departures may be safely ascertained.

Moreover, methods are known in the art in which two divergent beams are used for forming the guide line in such a way that, with dissimilar identifications of these beams, a permanent signal is produced in the receiver along the line of unvaried signal, that is, along the equisignal zone.

However, all of these methods do not afford any clues whatever regarding the distance of the airplane from an airport, or obstacle to be particularly kept under observation. They do not allow of any clear clues respecting the direction of flight or course, that is to say, whether the plane is travelling towards, or else away from, the destination. Under such conditions and with blind flying serious piloting errors are apt to be made.

In German Patent #507,501, a method has been disclosed which is adapted to position-finding of craft. This patent discloses a system in which the territory to be covered by an airplane is divided in accordance with a rectangular coordinate system into elementary areas. To each one of these latter is co-ordinated a constituent transmitter, and each of these beacons or transmitters has its own identification. It will be understood that such a method involves a great deal of material and installation, and a local indicator comprising a great number of resonant systems, and these, in turn, divert a great deal of attention on the part of the pilot which may be required for other work. Another point is that, inasmuch as there is no standard size or shape for airports and landing fields, etc., it follows that a specially designed local indicator system will be needed for each individual airport.

By the present invention, in addition to a simplified guiding of airplanes, determination of position in the sense of distance determination is to be made feasible.

The transmitter or beacon arrangement according to this invention designed for the guidance of aircraft along a preferred course consists in the feature that the line of flight is covered or studded with a row of vertical radiators. Now the radiation characteristic of each individual radiator is so formed and designed that a horizontal section results in a shallow ellipse whose longitudinal axis coincides with or falls within the guide line. For determining distance each individual radiator is provided with its own identification, say, by dissimilar wave-lengths, or, in case the same wave-length is used throughout, by dissimilar modulation. Identification should be preferably so chosen that it will be possible to tell immediately at what distance the craft happens to be from the goal or destination, and whether the course is towards or away from the latter, and this is extremely important in case of blind flying in foggy weather.

The present invention is particularly suited for guiding or piloting airplanes towards landing fields and for steering them so as to circumvent obstacles liable to endanger the flight of a plane. For this purpose it is advisable to enlarge the guide-line at greater distances from the goal and at right angles to the main approach so to obtain a suitable guide zone. According to one method of doing this, as shown, for instance, in Fig. 1a, the beam at right angles to the guide line is allowed to diminish so that a sort of collector funnel results. In this manner it will be an easy matter for the pilot to safely reach the guide-line itself. In case the airplane should occasionally happen to drift into the guide-line from the side, the pilot will be readily enabled from the identification signal of the radiators to tell at what distance from his goal he has struck the guide-line. Thus, an identification signal may be chosen having a sequence characteristic corresponding to the distance (5 km=5 dots).

However, the practical use of the invention is not confined to aerial navigation (or avigation), but will be found useful also for the piloting of ships through channels between cliffs, and amongst submerged rocks, mine fields, etc.

Figs. 1 to 3 show by way of example a number of practical embodiments of transmitter or beacon arrangements of the kind here disclosed.

Fig. 1a, for instance, is a plan view of an airport 1 with part of a guide-line a, b, formed by separate elongated fields produced by radiators 2, 3, 4, and 5. In a modified scheme a piloting strip or zone e, c, e, d, is produced by elongated fields which are enlarged as shown by dotted lines to result in a guide funnel.

Fig. 1b shows in elevation (looking at right angles to the guide-line) the perpendicularly directed cone-shaped radiations of the individual radiators 2, 3, 4, and 5, and the approximate line of flight or course of an airplane.

Fig. 2a shows a plan of an airport 1 and the individual radiators 2 and 3 adjacent the goal (1). At the end of the radiation zone 2 turned towards the goal or destination there may be interposed advantageously an identification beacon 6 consisting of a strongly beamed circular individual radiation disposed at right angles to the guide-line with a shallow beam whereby the pilot is afforded a signal instructing him to get set for the direct landing.

Figure 2b shows an elevation view. At points 2 and 3 respectively beams of radiation are projected upwardly and expanding as they rise in altitude. The expansion is greater in the direction of intended flight of an airplane approaching a landing field. However, the sources 2 and 3 are spaced apart sufficiently so that there is no overlapping of the beams. The beam from the source 2 is preferably inclined away from the region overlying the airport 1. This beam, therefore, possesses a vertically disposed margin line adjacent said region. If desired, an additional beam 6 may be provided between the beam from source 2 and the region overlying the airport or landing field. It is desirable that this beam 6 should also be maintained separate and distinct from the inclined beam from source 2 in order that a plane flying through successive beams may be able to distinguish first one and then another until it reaches and traverses the beam 6 which gives an indication of the boundary of said airport or landing field.

Fig. 3a shows a plan of the landing field 1 and the individual radiator 2 closest to the goal. Upon both sides of the said individual radiator 2 radiators 7 and 8 radiating at an oblique angle are provided. Fig. 3b being a transverse elevation (looking from the landing field 1 in the direction of the guide-line a, b) shows the vertical radiator 2 and the two lateral radiators 7 and 8. The three cones of radiations bound a definite altitude layer f, the means height h of which is a function of the angle α of the radiators 7 and 8 in reference to the ground, and of the lateral distance s on the ground. In this particular altitude layer the identification signals of the three radiators, for instance, may result in a permanent signal so that the pilot receives altitude data in addition to distance data.

At the end of the radiation cone 2 (direction towards the goal) which is characterized by the identification beacon 6 or else by the end of the permanent signal produced by 2, 7, 8, the pilot must then get set for a direct landing, say, along a guide-line or zone identifiable by a constant signal strength or by means of some other method.

I claim:

1. An aerial navigation system comprising a plurality of sources of concentrated radio beams, each of said sources being adapted to radiate its beam upward from the ground and with a narrow elliptical cross section having the major axis thereof coincident with a direction of flight to be indicated, said sources being so spaced apart and so aimed that their beams are substantially separated one from another, and the axis of one of said beams is so inclined away from the region overlying an adjacent landing field that said beam possesses a substantially vertical margin adjacent said region.

2. A system in accordance with claim 1 and having means including an additional radio beam source for projecting energy substantially vertically in a pencil of circular cross section out of contact with, but closely adjacent the vertical margin of that beam which possesses an inclined axis.

3. A system in accordance with claim 1 and having said radio beam sources so characterized that each source, starting with the one second from the landing field, projects its beam more expansively than does the preceding source in a plane transverse to the direction of flight.

MICHAEL LOCK.